(12) United States Patent
Hoedl et al.

(10) Patent No.: US 6,251,323 B1
(45) Date of Patent: Jun. 26, 2001

(54) PLASTIC MOLDING PROCESS AND PRODUCTS PRODUCED THEREBY

(75) Inventors: Herbert K. Hoedl; Eufredo Maury; Dave Cockle, all of Concord (CA)

(73) Assignee: Royal Eco Products Limited, Ontario (CA)

(*) Notice: Subject to any disclaimer, the term of this patent is extended or adjusted under 35 U.S.C. 154(b) by 0 days.

(21) Appl. No.: 09/367,046

(22) PCT Filed: Feb. 9, 1998

(86) PCT No.: PCT/CA98/00073

§ 371 Date: Aug. 6, 1999

§ 102(e) Date: Aug. 6, 1999

(87) PCT Pub. No.: WO98/34779

PCT Pub. Date: Aug. 13, 1998

(30) Foreign Application Priority Data

Feb. 10, 1997 (CA) .................................................. 2197136

(51) Int. Cl.[7] ...................................................... B28B 7/22
(52) U.S. Cl. .............................................. 264/254; 264/275
(58) Field of Search ................................. 264/254, 255, 264/275, 279, 328.8

(56) References Cited

U.S. PATENT DOCUMENTS

| | | |
|---|---|---|
| 1,917,729 | 7/1933 | Duffy . |
| 4,260,405 | 4/1981 | Ambrogi . |
| 4,544,126 * | 10/1985 | Melchert .............................. 249/83 |
| 5,112,542 * | 5/1992 | Beer .................................... 264/254 |
| 5,298,098 | 3/1994 | Hoedl . |
| 5,888,437 * | 3/1999 | Calabria et al. ...................... 264/275 |
| 6,042,768 * | 3/2000 | Calabria et al. ...................... 264/275 |

FOREIGN PATENT DOCUMENTS

| | | |
|---|---|---|
| 1119503 B29 | 12/1961 | (DE) . |
| 43 01 444 A1 B29 | 7/1964 | (DE) . |
| 43 22 888 A1 B29 | 1/1965 | (DE) . |
| 1241594 B29 | 6/1967 | (DE) . |
| 0 578 466 A1 | 7/1993 | (EP) . |
| 1234237 B29 | 10/1960 | (FR) . |
| 2287995 | 5/1976 | (FR) . |
| 2262469 | 6/1963 | (GB) . |

OTHER PUBLICATIONS

Masakazu, Matsufuji (Inventor) Patent Abstracts of Japan, No. 02050810, Feb. 20, 1990.

Tadashi, Yamamoto (Inventor) Patent Abstracts of Japan, No. 58147331, Sep. 2, 1983.

* cited by examiner

Primary Examiner—Peter M. Cuomo
Assistant Examiner—Jerry A. Anderson

(57) ABSTRACT

The invention utilizes the adhesive properties which plastic material exhibits while still hot combined with a multi stage molding operation wherein one side of an insert or core located in one side of a mold is coated with molten plastic on a first closing of the mold, the mold is then opened with the plastic still hot to remove the insert or core from the one mold side by virtue of its adherence by the hot plastic to the other mold side, a second charge of plastic is then introduced into the said one mold side and the mold is closed again with the plastic in a molten state to complete the encapsulation of the insert or core.

14 Claims, 5 Drawing Sheets

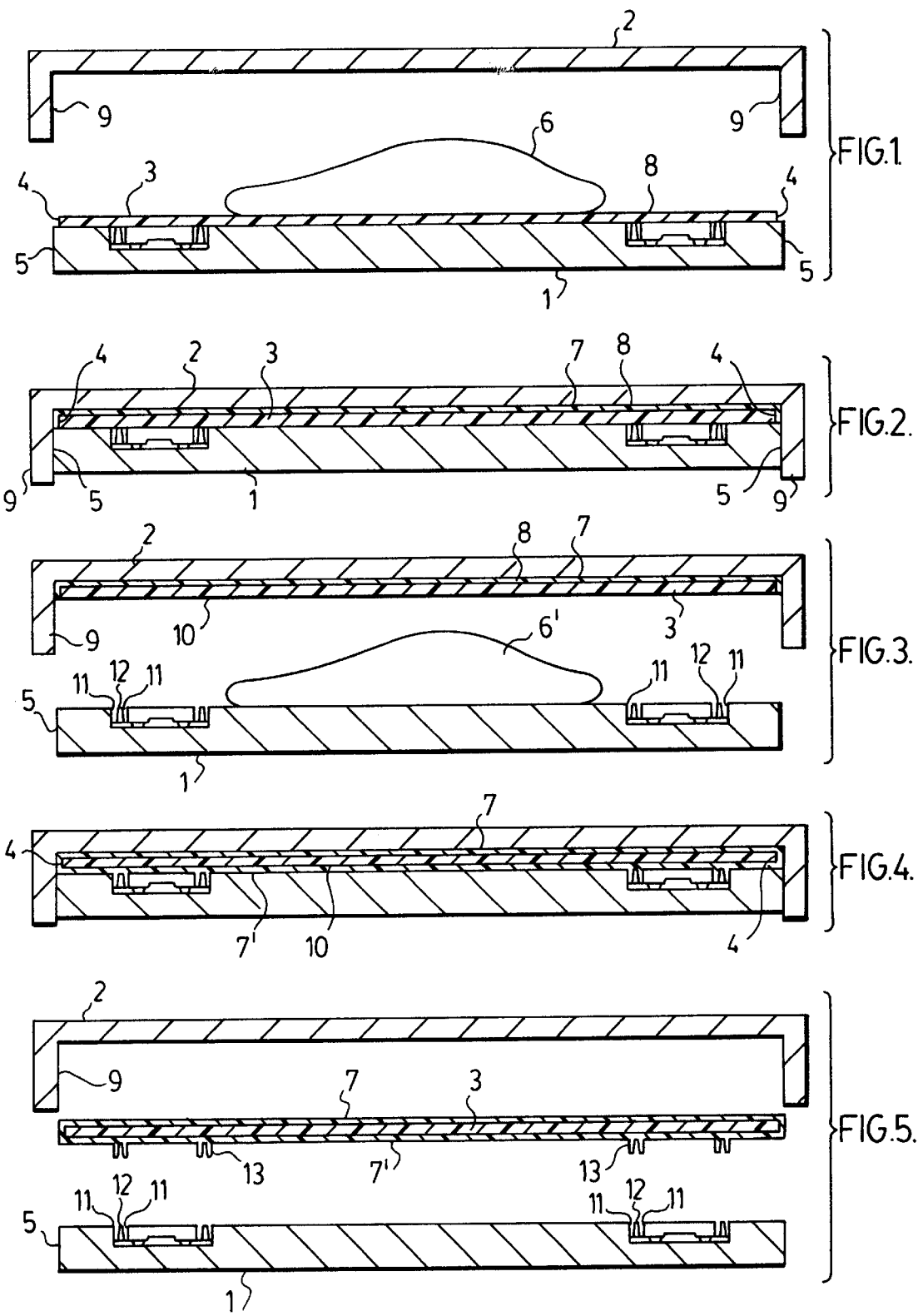

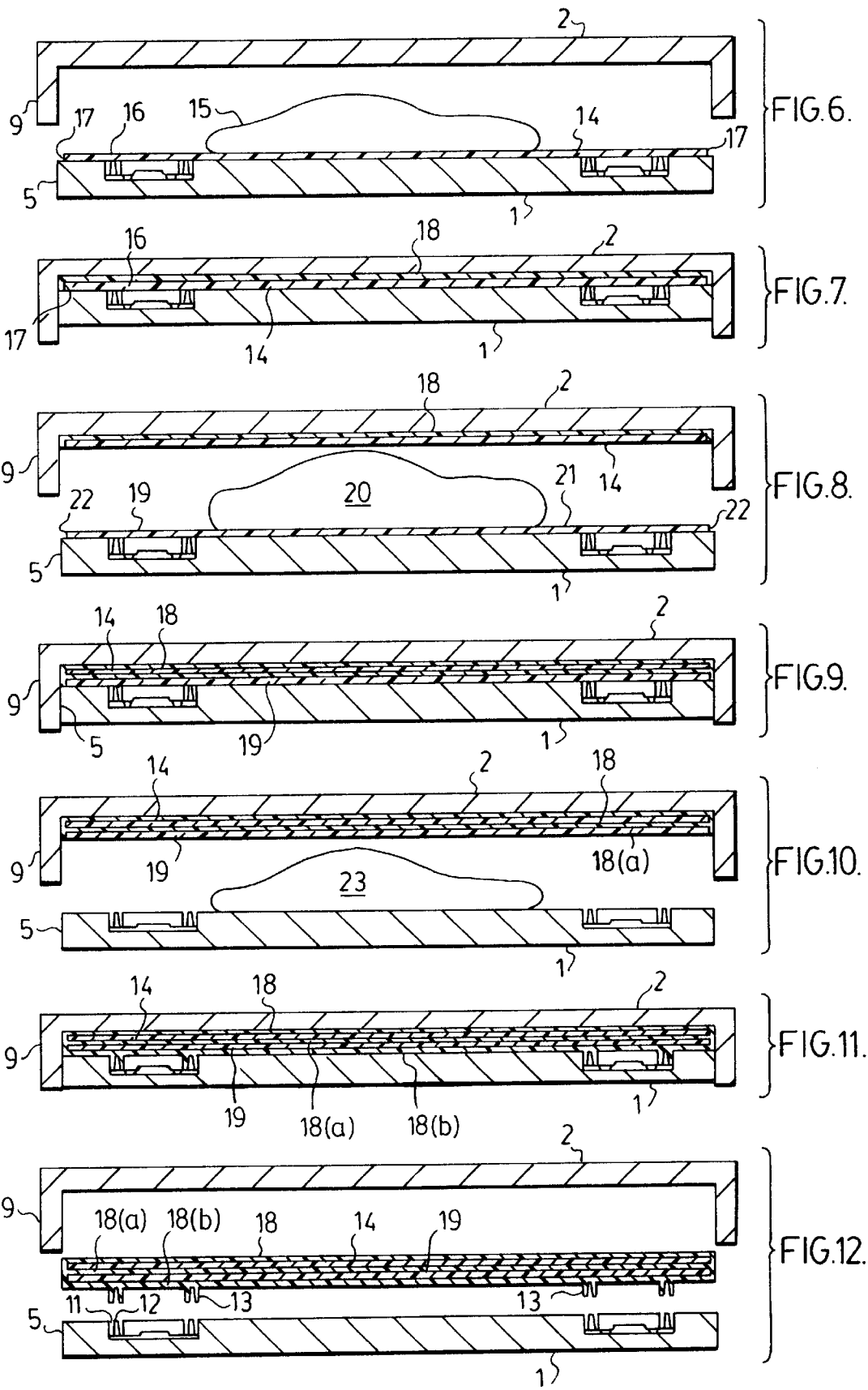

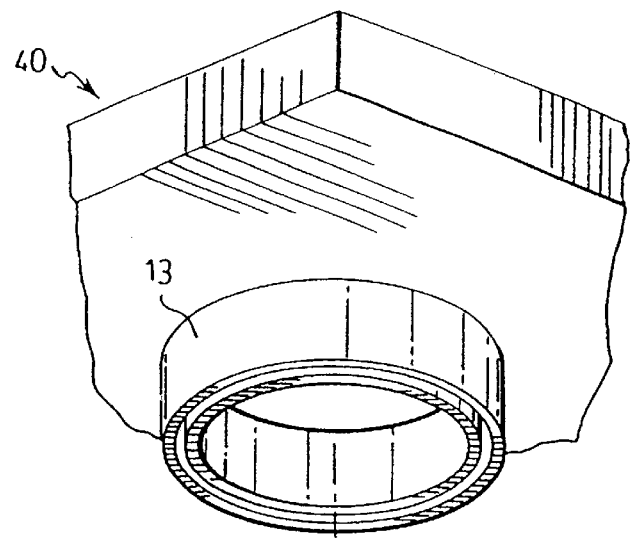
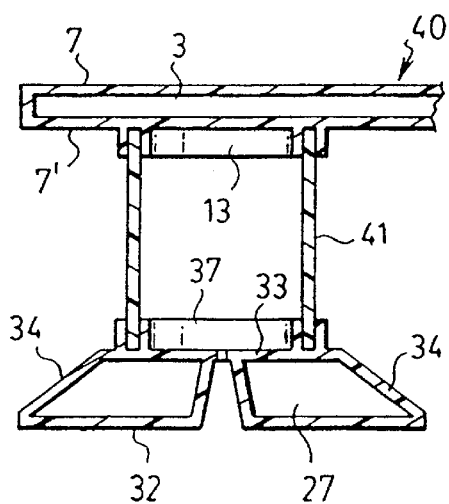
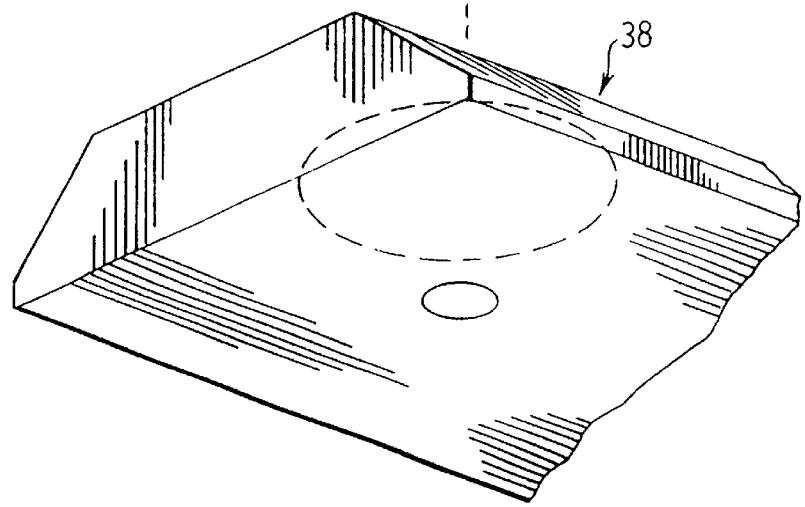
FIG. 23.
FIG. 22.

PLASTIC MOLDING PROCESS AND PRODUCTS PRODUCED THEREBY

FIELD OF THE INVENTION

This invention relates to plastic molding processes and products produced thereby and more particularly to a plastic molding process wherein insert members or cores inserted into a mold are completely encapsulated by the plastic introduced into the mold during the molding operation.

BACKGROUND OF THE INVENTION

Insert molding is a widely used method to incorporate functional components such as metal pins, screws, electrical contacts, etc. into a plastic injection molding. These functional components are typically inserted at predetermined locations in the open molding tool which comprises a core side and a cavity side which when brought together or closed define the desired mold shape. After the functional components have been inserted, the tool is closed, and the molten plastic is injection into the cavity. The molten plastic flows around these inserts and after appropriate cooling the part can be removed from the tool with these inserts partly incorporated in the plastic body.

Similar insert molding techniques are used for compression molding of e.g. polyester based Sheet Molding Compound (SMC). Here the functional part is inserted in the core and/or cavity side while the tool, which is heated, is open. Next the SMC is loaded into the tool and, as the tool is closed, the polyester SMC starts to flow under heat and pressure, filling the cavity and flowing around the inserts. After appropriate curing time the part can be removed from the tool with the inserts partly incorporated in the plastic body.

Another technique utilizes the insertion of a preformed metal or plastic skin into the cavity side of the mold and the insertion of devices by means of which the part to be molded is to be fastened to other parts into the core side of the mold. The skin and the fastening devices are then combined with the injection of e.g. structural foam to produce one integral piece such as automotive bumper guards.

Other known techniques involve the molding of thermoplastic material onto or around another component, such as Outsert Molding. This process uses a technique where an object is placed at the parting line between the core and cavity of a tool and actually extends out of the tool. After closing of the tool molten material is injected into the cavity and the portion of the object which is inside the cavity is being covered with plastic.

These known methods of insert molding mentioned above involve the placements of the inserts into the core or cavity side of the mold prior to molding resulting in only a portion of the insert being anchored into the plastic moldings.

One example of actual encapsulation of almost 100% of a core into an injection molding is the so called "Lost Core" molding technique used to produce complicated hollow plastic components such as engine intake manifolds. In this method, a metal alloy is first cast into a shape which resembles the hollow interior of the plastic components to be produced. This metal component or core is then placed into an injection molding tool at a predetermined location and held in place by e.g. pins, moving side cores, or in certain locations by the tool parting line. The gap between the metal components and the cavity wall determines the wall section of the finished plastic part.

Following the securement of the metal component, the tool is then closed and molten plastic is injected between the metal component or core and the walls of the cavity. After appropriate cooling the plastic part with a metal core is removed from the tool and placed into a hot oil bath. The metal core is melted by the hot oil and can escape through the openings formed during the injection molding process where the metal core was held in place in the tool prior to molding. The resulting plastic part is hollow, similar to a blow molding, however more complex and with very smooth inner walls.

A technique for encapsulating prefabricated cores with an injected liquid resin is known under the name of Resin Transfer Molding (RTM). This technique involves the fabrication of e.g. a foam core surrounded by several fiberglass mats. This prefabricated core is placed into a tool. The tool is closed and a liquid resin such as epoxy resin is injected into the space provided between the fibers of the fiberglass mat to totally encapsulate the foam core. Sometimes vacuum is applied to the tool, assisting the flow of the resin and the complete wet out of the fiberglass mat. After curing of the epoxy resin, the part can be removed from the tool. This technique is used, for example to produce lightweight and stiff automotive hoods.

These known techniques directed at encapsulating a core or insert involve a mechanical means to keep the core in a predetermined distance from the cavity walls by means of e.g. pins (Lost Core) or a fiberglass mat (RTM) which enables the core to be almost completely encapsulated. It is the object of the present invention to enable the complete encapsulation of a core or insert without the use of pins or other locating means.

DE-A-430144 discloses a method of encapsulating a core or blank by a first molding operation in which the blank is supported on a first mold part matching its shape and its exposed upper surface covered by a layer of plastic injected into a second mold part having a greater perimeter than the blank to provide a projecting plastic border around the blank perimeter. Then in a subsequent second molding operation using a third mold part having a perimeter greater than the blank, the undersurface of the blank is covered by a layer of plastic which extends beyond the perimeter of the blank to again provide a plastic border to butt against the plastic border produced in the fist molding operation. Such a method requires two molding operations using different tooling to effect the encapsulation and results in a butt joint around the perimeter of the blank.

SUMMARY OF THE INVENTION

The present invention resides in providing a molding operation which enables the total encapsulation of a core or an insert or inserts in a surrounding plastic material by the utilization of the plastic material itself to secure the core or insert in position within the enveloping plastic during the molding operation.

In this respect, the invention utilizes the adhesive properties which plastic material exhibits while still hot combined with a multi stage molding operation wherein a core or insert is placed in one side of a mold. A first charge of plastic material is introduced between the core or insert and the other side of the mold and the mold is closed with the plastic material in a molten state to coat the exposed surfaces of the core or insert with a plastic layer. The mold is then opened while the plastic layer is still hot causing the core or insert which is adhered to the other side of the mold by the hot plastic layer to be removed from the one mold side. A second charge of plastic material is then introduced into the mold side from which the core or insert has been removed.

The mold is then closed with the plastic in a molten state to coat the remainder of the insert or core.

In the preferred form of the invention, the charges of plastic material are charges of thermoplastic material introduced into the mold while in a molten state. However, it will be understood that thermoset plastic material may also be used and that, through the use of heated tooling, the plastic charges can be heated in the mold as part of the molding operation.

It will be understood that the quantity of plastic introduced into the mold in each of the plastic charges will determine the thickness of the surrounding or encapsulating layer of plastic.

It will also be understood that the molding steps can be repeated to encapsulate two or more inserts.

The molding process of the invention in which inserts or cores are totally encapsulated with a continuous plastic film or layer gives rise to novel totally encapsulated products and structures which heretofore could not be produced and the invention further relates to such novel products and structures.

BRIEF DESCRIPTION OF THE DRAWINGS

FIG. 1 is a cross-sectional view of an open mold in which an insert or core has been placed on the core side of the mold and a first charge of plastic, which in the preferred embodiment of the invention is a viscous molten thermoplastic, has been introduced into the mold on top of the insert or-core, that is, between the insert and the cavity side of the mold preparatory to the closing of the mold.

FIG. 2 shows the mold of FIG. 1 in the closed position showing the molten plastic charge compressed to flow and cover the upper surface and the periphery of the insert or core as enabled by the spacing between the perimeter of the mold and the perimeter of the insert.

FIG. 3 shows the next step in which the mold is open while the plastic material is still hot causing the plastic material through its adhesion to the insert or core and to the cavity side of the mold to carry the insert or core off the core side of the mold and showing a second charge of viscous molten plastic introduced into the mold on the core side of the mold, that is, between the insert or core and the mold core side.

FIG. 4 shows the further step in which the mold has been closed again causing the second charge of molten plastic to spread and cover the underside of the insert or core and to meet the still hot plastic of the first charge around the perimeter of the insert or core to complete the encapsulation of the insert or core.

FIG. 5 is a view showing the mold open again and the completely encapsulated insert or core being removed after the plastic material has cooled sufficiently to harden.

FIGS. 6 through 12 illustrate the molding steps corresponding to those shown in FIGS. 1 through 5 for encapsulating two inserts or cores.

FIG. 6 corresponds to FIG. 1 showing a first insert or core placed on the core side of the mold and the first charge of viscous molten plastic material introduced into the open mold on top of the first insert or core.

FIG. 7 corresponds to FIG. 2 and shows the mold closed.

FIG. 8 is similar to FIG. 3 but in this case a second insert or core has been placed on the core side of the mold and a second charge of viscous molten plastic has been placed on top of the second insert or core.

FIG. 9 shows the mold closed and showing the first insert or core fully encapsulated and the second insert or core having its top surface and perimeter covered with the compressed and distributed plastic charge.

FIG. 10 shows the second opening of the mold this time while the plastic material is still hot and a third charge of viscous molten plastic material introduced into the mold between the underside of the second insert or core member and the core side of the mold by being deposited on the core side of the mold.

FIG. 11 shows the third closing of the mold to complete the encapsulation of the second insert or core.

FIG. 12 shows the final opening of the mold after the plastic material has hardened sufficiently on cooling that the multi insert or core encapsulated product can be handled and removed.

FIG. 22 is a broken away perspective view illustrating where the products produced by FIGS. 1 to 5 inclusive and FIGS. 13 to 17 inclusive are being used to form a pallet with the pallet being in the process of being assembled.

FIG. 23 is a broken away vertical sectional view of the assembled pallet of FIG. 22.

Figure 13:
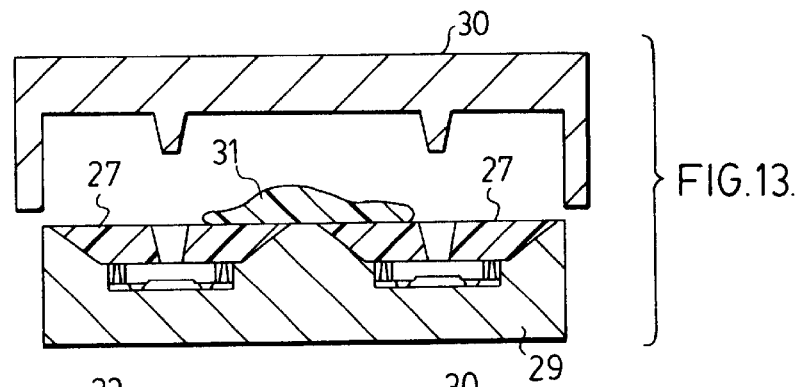
FIGS. 13 to 17 correspond to FIGS. 1 to 5 inclusive but showing a different insert or core structure.
Figure 14:
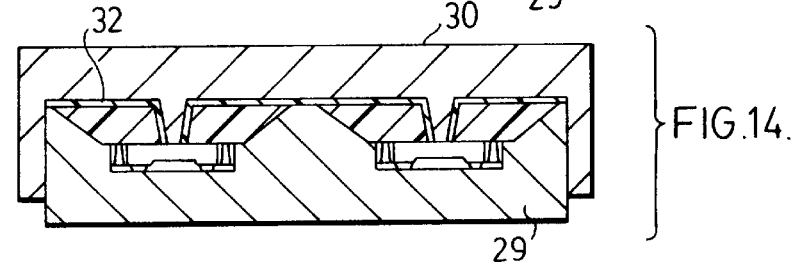

DETAILED DESCRIPTION ACCORDING TO THE PREFERRED EMBODIMENTS OF THE PRESENT INVENTION

Returning first to FIGS. 1 to 5, FIG. 1 shows a molding tool or mold comprising a core side 1 and a cavity side 2 with the mold in the open position and an insert 3 which may, for instance, be a wafer board having a dimension slightly less than the dimension of the mold sides so that the edges 4 of the insert or core 3 stop short of the edges 5 of the core side 1.

Placed on top of the insert 3 is a charge 6 of plastic material, preferably a viscous molten thermoplastic material, having a predetermined measured quantity so that, when the mold is closed under pressure to the position shown in FIG. 2, the plastic material will be spread as a thin layer 7 covering the upper surface 8 and edges 4 of the insert or core with the plastic material being confined at the edges 4 of the insert by the perimeter walls or edges 9 of the cavity side 2 of the mold which telescopically engage the core side edges 5 as shown in FIG. 2.

Following closure of the mold under pressure to spread the plastic material 6 to cover the upper surface and edges of the insert or core 3, the mold is then opened as illustrated in FIG. 3 while the plastic material is still hot utilizing its viscosity or adhesive qualities to secure the material to the cavity side of the mold and to the core or insert 3 to remove the insert from the core side of the mold. Thus, the layer 7 of plastic material now forms the means of supporting the insert or core in the mold without requiring any pins or other support mechanism and the thickness of the plastic layer 7 determines the spacing between the cavity side of the mold and the core, that is, the location of the core.

Also as shown in FIG. 3 a second charge 6' of viscous molten plastic material as aforesaid is introduced into the mold by placing same on the core side 1 of the mold following which the mold is closed as illustrated in FIG. 4 wherein the second charge 6' of the molten material is spread as a thin layer 7' to cover the undersurface 10 to complete the encapsulation of the core by uniting with the still hot plastic material of the layer 7 at the boundary or edges 4 of the core 3.

Following cooling and hardening of the plastic layers 7 and 7', the mold is opened as illustrated in FIG. 5 and the encapsulated core removed.

FIGS. 1 to 5 illustrate a molding operation carried out with the molding tool arranged conveniently in a horizontal position with the core side 1 oriented beneath the cavity side 2. It will be understood that the arrangement could be reversed with the cavity side 2 disposed beneath the core side 1 in which case the insert or core 3 would first be placed in the cavity side 2 of the mold and the first charge 6 of molten plastic material introduced into the cavity side of the mold on top of the core 3 and, in the sequence of molding steps, the roles of the cavity and core sides of the molds would be reversed throughout the sequence of mold steps to obtain the completely encapsulated insert or core 3.

As illustrated in FIGS. 1 to 5, the core side 1 of the mold is formed with a pair of circular channels 11 having tapered center posts 12 into which material from the charge 6' is forced under pressure to provide the dependent annular hollow rings 13 on the underside of the encapsulated core as illustrated in FIG. 22.

It will be understood that the core side and as well the cavity side of the mold may be formed to provide ribs, grooves or designs as desired in the encapsulating plastic layers 7 and 7'.

FIGS. 6 to 12 illustrate the application of the method to provide a product having a multiple layers of inserts or cores which are completely encapsulated.

As in the case of FIGS. 1 to 5, the method is illustrated with the mold tool in a horizontal position with the core side 1 below the cavity side 2.

With this arrangement of the tooling, a first insert or core 14 is placed on the core side 1 of the mold and a first charge 15 of viscous molten thermoplastic material is placed on top of the core 14 as illustrated in FIG. 6. Then, as illustrated in FIG. 7, the mold is closed under pressure to spread the plastic material to cover the upper surface 16 and the edges 17 of the core 14.

Again, as illustrated in FIG. 8, the mold is open and the layer 18 of the plastic material adhering to the cavity side 2 of the mold and the first core 14 carries the first core 14 up away from the core side 1 of the mold at which time a second insert or core 19, shown in FIG. 8 as having the same dimensions as the first core 14, is placed on the core side 1 of the mold and a second charge 20 of viscous molten thermoplastic material as aforesaid is placed on top of the second insert 19.

The mold then is closed under pressure as illustrated in FIG. 9 and a second charge of plastic material 20 is spread to complete the encapsulation of the first core 14 and to cover the upper surface 21 and the edges 22 of the second core 19 with plastic layer 18(a).

Again, while the plastic material of both the first charge 15 and the second charge 20 are still hot, the mold is opened as shown in FIG. 10 with the adhesive bond of the plastic with the cavity mold side 2 and the cores 14 and 19, the fully encapsulated core 14 and the partially encapsulated core 19, are removed from the core side 1 of the mold. A third charge 23 of viscous molten thermoplastic material as aforesaid is then placed on the core side 1 of the mold. The mold is again closed under pressure to complete the encapsulation of the second core 19 with a plastic layer 18(b) as illustration in FIG. 11. Upon cooling, the mold is opened and the multiple core product 24 removed from the mold.

FIGS. 13 to 17 illustrate the molding method being carried out to produce a pair of members having totally encapsulated cores which in the example given are to form the bottom members or runners of the pallet illustrated in FIG. 22.

In this case, a pair of inserts or core members 27 are placed in the correspondingly shaped dual wells 28 in the core side 29 of a molding tool arranged below the cavity side 30.

Next a charge of viscous molten thermoplastic material 31 is placed on the core side 29 of the mold on top of the core members 27 and the mold closed under pressure to provide a layer 32 of plastic covering the exposed surfaces of the core members 27, the thickness of the layer being dependent upon the quantity of plastic material in the charge 31.

Figure 15:
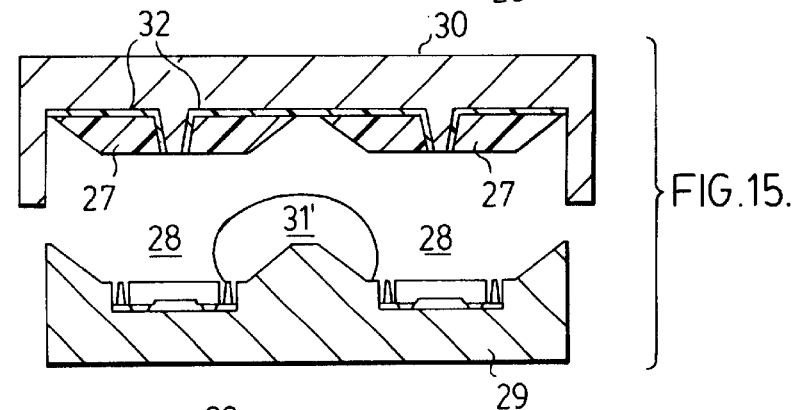

Again, while the plastic material 31 is still hot, the mold is opened as illustrated in FIG. 15 with the plastic material adhered to the cavity side of the mold and to the core members 27 to carry them away from the core side 29 of the mold.

Figure 16:
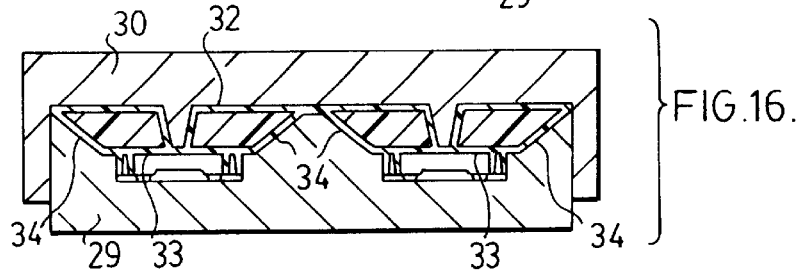
Figure 17:
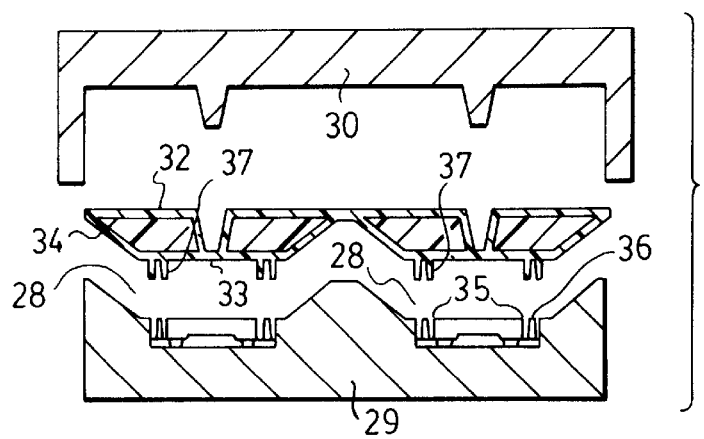

A second charge 31' of viscous thermoplastic material as aforesaid is introduced centrally into the core side 29 of the mold and the mold is again closed under pressure as illustrated in FIG. 16 causing the second charge of plastic 31' to spread and complete the encapsulation of the core members 27 with a horizontal layer 33 extending across the bottom of the core members 27 and inclined layers 34 joining the bottom layer 33 with the layer 32.

Again, the core side 29 of the mold is shown as having circular channels or grooves 35 with tapered center parts 36 to produce hollow mounting rings 37.

After removal from the mold, the encapsulated core members 27, which comprise pallet runners 38, are separated and incorporated into a pallet designated at 39 ( FIGS. 22 and 23) comprising the upper platform 40, runners 38 (only one being shown) connected by spacers 41 which are welded, preferably by spin welding, into the annular rings or channels 13 and 37 of the pallet platform 40 and the pallet runner 38 as illustrated in FIG. 23.

Figure 18:
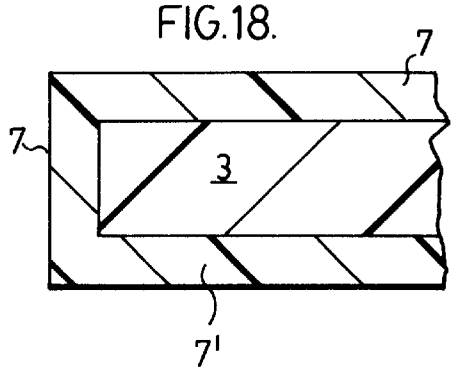
FIG. 18 is a broken away vertical section on an enlarged scale of the encapsulated insert or core produced by the molding operations of FIGS. 1 to 5 inclusive.

FIG. 18 is a cross-section of a corner portion of the product produced by the process of FIGS. 1 to 5 showing the core or insert 3 encapsulated by the layers 7 and 7' from the material of the plastic charges 6 and 6' respectively.

Figure 21:
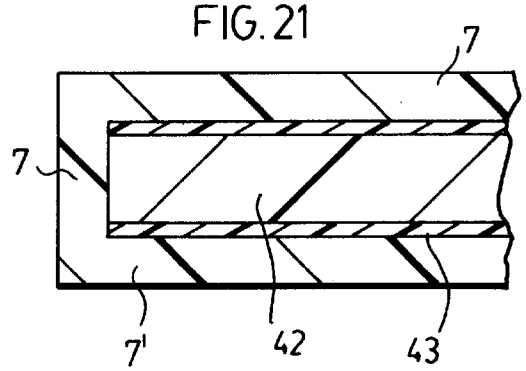
FIG. 21 is a view similar to FIG. 18 but showing the insert or core as comprising a composite sandwich of material.

While the core 3 may, for instance, be wafer board, it may be any other desired insert such as a foamed product or a composite product such as illustrated in FIG. 21 which comprises a central foam layer 42 wrapped in a fiber glass mat 43 with the plastic layers 7 and 7' wetting the glass mat and penetrating open pores of the foamed central portion 42 of the composite insert.

It will be understood that the plastic charges 6 and 6' may have different compositions or colours as desired so that the layers 7 and 7' can be coloured differently, have different compositions and different characteristics.

Figure 19:
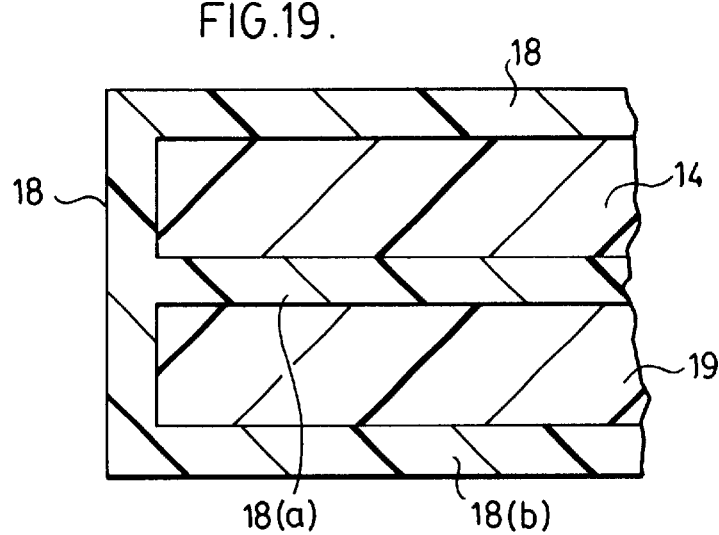
FIG. 19 is a broken away vertical section on a large scale of the encapsulated dual or multi-core product produced by the molding steps of FIGS. 6 to 12 inclusive.

FIG. 19 illustrates a cross-section of a corner of the product produced by the process illustrated in FIGS. 6 to 12 where a pair of inserts 14 and 19 are encapsulated in plastic.

Again, it will be appreciated that these inserts may be the same or different as discussed in connection with FIG. 21.

Additionally, the method of encapsulating two inserts as illustrated in FIGS. 6 to 12 can be continued to encapsulate three or more separate inserts or cores to incorporate for instance a central insert of foamed material sandwiched between two separate wafer board inserts.

Figure 20:
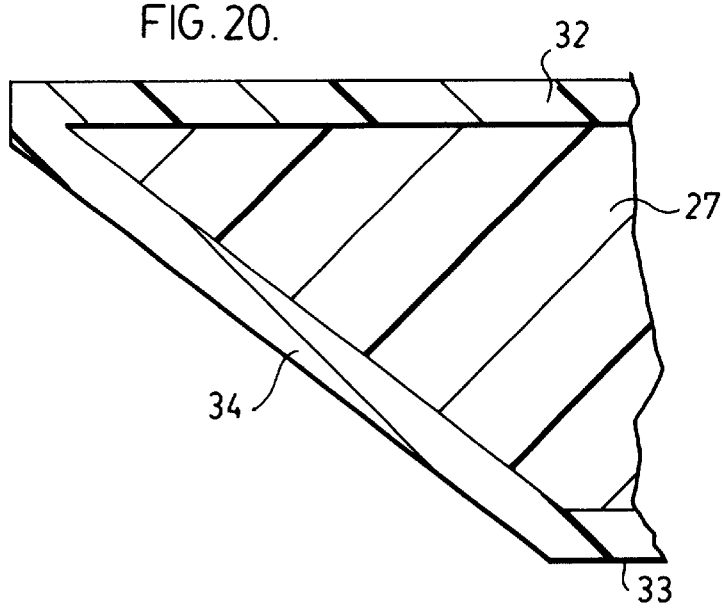
FIG. 20 is a broken away vertical sectional view on an enlarged scale of the encapsulated insert or core produced by the molding steps of FIGS. 13 to 17 inclusive.

FIG. 20 is a cross-section of one of the corners of one of the encapsulated inserts 27. Again the insert or core 27 may take different forms including a composite core such as discussed with respect to FIG. 21.

While the preferred method for the method of the present invention is the use of a compression molding process using horizontally mounted tools with telescoping edges with either the core or cavity side facing upwards for easy placement of the core or cores, the method can be carried out using the injection or injection/compression molding process with either horizontally or vertically mounted tooling as long as telescoping edge tooling or other means such as moving side cores to contain the liquid plastic material is used. In this latter case, a system for securing the position of the core or prefabricated core materials must be provided during the first injection step, that is, until the process has proceeded until the hot plastic through it adhesive properties fixes the insert in position in the mold.

When using the injection or injection/compression molding process with vertically mounted tooling in addition to the provision for the containment of the liquid material and for initially securing the position of the core or prefabricated cores in position until they are secured by the adhesive property of the plastic material, one or more apertures in the prefabricated core may be necessary to inject the first charge of molten material through the core into the core or cavity side of the tool.

As mentioned, the preferred type of materials in carrying out the method of the invention are thermoplastic materials which can be used with water cooled tools. However, thermoset materials such as polyester S.M.C., epoxy and the like can also be used and rather than introducing the charges of plastic material into the mold in a molten state they may be brought to the molten state by heated molds or tools as part of the molding operation.

Although various preferred embodiments of the present invention have been described herein in detail, it will be appreciated by those skilled in the art, that variations may be made thereto without departing from the scope of the appended claims.

The embodiments of the invention in which an exclusive property or privilege is claimed are defined as follows:

1. A method of completely encapsulating an insert or core in plastic material characterized by placing said insert or core in and supporting it on one side of a mold tool having a core side and a cavity side whose perimeters are greater than the perimeter of said insert or core and having means to confine plastic flow within said mold tool while permitting plastic to flow around and cover the periphery of said core or insert, introducing a first charge of plastic between said insert or core and the other side of said mold tool, distributing said plastic material under pressure with said plastic in molten state to coat the upper side and periphery of said insert or core with a plastic layer, separating said mold sides while said plastic is still hot to utilize the adhesive properties of said plastic layer to fix said insert or core to said other mold side to lift said insert or core off said one mold side, and while said plastic from said first charge is still hot introducing a second charge of plastic into said one mold side underneath said insert or core, and distributing said second plastic charge under pressure with said plastic of said second charge in a molten state to coat the underside of said insert or core with a plastic layer and to unite with the hot plastic from the first charge covering the periphery of said core or insert to provide on cooling a completely continuous plastic layer completely encapsulating said insert or core.

2. A method as claimed in claim 1 characterized in that said first and second plastic charges are introduced into said mold in a molten state.

3. A method as claimed in claim 2 characterized in that said plastic material is a thermoplastic material.

4. A method as claimed in claim 2 characterized in that said plastic material is a thermoset material.

5. A method as claimed in claim 1 characterized in that said mold tool is a heated tool and said plastic material is heated to a molten state in said heated tool.

6. A method as claimed in claim 4 characterized in that said mold tool is a heated tool and said thermoset plastic material is heated to a molten state in said heated tooling.

7. A method as claimed in claim 1 characterized in that said first charge of plastic material is introduced between said insert or core in a molten state and is distributed under pressure by closing said mold tool.

8. A method as claimed in claim 1 or 7 characterized in that said second charge of plastic is introduced underneath said insert or core and is distributed under pressure by closing said mold tool.

9. A method as claimed in claim 1 characterized in that said core is a rigid planar member.

10. A method as claimed in claim 1 characterized in that said core is a member formed of foam material.

11. A method as claimed in claim 10 characterized in that said foam member has open cells and said plastic material is forced into said open cells during distribution of said plastic material under pressure to encapsulate said core.

12. A method as claimed in claim 1 characterized in that said core has a composite structure comprising a central foamed member wrapped in a surrounding glass mat, and said plastic material is forced into the interstices of said glass mat and foam cells during distribution of said plastic material under pressure to impregnate said glass mat and enter said foam cells.

13. A method as claimed in claim 1 characterized in that said mold sides have telescoping edges.

14. A method as claimed in claim 1 in which a second insert or core is encapsulated beneath said encapsulated insert or core by repeating the steps recited in encapsulating core while the plastic material of said plastic charges and are still hot.

\* \* \* \* \*